US012676956B2

(12) United States Patent
Zhang et al.

(10) Patent No.: US 12,676,956 B2
(45) Date of Patent: Jul. 7, 2026

(54) VISUAL DETECTION EQUIPMENT AND VERIFICATION METHOD THEREOF, AND CAMERA VERIFICATION PIECE

(71) Applicant: CONTEMPORARY AMPEREX TECHNOLOGY (HONG KONG) LIMITED, Hong Kong (CN)

(72) Inventors: Zhipeng Zhang, Ningde (CN); Ziyang Shen, Ningde (CN); Yong Chen, Ningde (CN); Ping Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 360 days.

(21) Appl. No.: 18/491,687

(22) Filed: Oct. 20, 2023

(65) Prior Publication Data

US 2024/0163418 A1 May 16, 2024

Related U.S. Application Data

(63) Continuation of application No. PCT/CN2023/080211, filed on Mar. 8, 2023.

(30) Foreign Application Priority Data

Nov. 15, 2022 (CN) .......................... 202223035724.9

(51) Int. Cl.
| | |
|---|---|
| *H04N 17/00* | (2006.01) |
| *G06T 7/00* | (2017.01) |
| *G06T 7/80* | (2017.01) |

(52) U.S. Cl.
CPC ......... *H04N 17/002* (2013.01); *G06T 7/0004* (2013.01); *G06T 7/80* (2017.01)

(58) Field of Classification Search
USPC .......................................................... 73/1.56
See application file for complete search history.

(56) References Cited

U.S. PATENT DOCUMENTS

2019/0373251 A1* 12/2019 Schulz ................. G06K 7/1417

FOREIGN PATENT DOCUMENTS

| CN | 105704282 A | 6/2016 |
|---|---|---|
| CN | 106780625 A | 5/2017 |
| CN | 107181941 A | 9/2017 |
| CN | 111432204 A | 7/2020 |
| CN | 111462253 A | 7/2020 |
| CN | 112669394 A | 4/2021 |
| CN | 113888626 A | 1/2022 |
| CN | 218941186 U | 4/2023 |

(Continued)

OTHER PUBLICATIONS

The European Patent Office (EPO) The Extended European Search Report for Application No. 23751520.0 Jul. 15, 2024 14 Pages.

(Continued)

*Primary Examiner* — Walter L Lindsay, Jr.
*Assistant Examiner* — Warren K Fenwick
(74) *Attorney, Agent, or Firm* — ANOVA LAW GROUP, PLLC

(57) ABSTRACT

A camera verification piece includes a body provided with a verification structure for detection by visual detection equipment. The verification structure is constructed to adapt to a to-be-detected structure on a to-be-detected part.

19 Claims, 18 Drawing Sheets

(56) References Cited

FOREIGN PATENT DOCUMENTS

WO          2019090703  A1      5/2019

OTHER PUBLICATIONS

The European Patent Office (EPO) The Extended European Search
Report for Application No. 23751520.0 Mar. 18, 2025 5 Pages.
The World Intellectual Property Organization (WIPO) International
Search Report for PCT/CN2023/080211 Jun. 28, 2023 12 pages
(including English translation).
The European Patent Office (EPO) Communication pursuant to
Article 94(3) EPC for Application No. 23751520.0 Aug. 7, 2025 5
Pages.
The European Patent Office (EPO) Intention to grant for Application
No. 23751520.0 Dec. 12, 2025 5 Pages.

* cited by examiner

VISUAL DETECTION EQUIPMENT AND VERIFICATION METHOD THEREOF, AND CAMERA VERIFICATION PIECE

CROSS-REFERENCE TO RELATED APPLICATIONS

This application is a continuation of International Application No. PCT/CN2023/080211, filed on Mar. 8, 2023, which claims priority to Chinese Patent Application No. 202223035724.9, filed with the National Intellectual Property Administration, PRC on Nov. 15, 2022 and entitled "CAMERA VERIFICATION PIECE AND VISUAL DETECTION EQUIPMENT", which are incorporated herein by reference in their entirety.

TECHNICAL FIELD

This application relates to the field of camera verification technologies, in particular to visual detection equipment and a verification method thereof, and a camera verification piece.

BACKGROUND

With the continuous progress of science and technology and the continuous development of industrial automation, as well as the improvement of people's living standards, people's demand for product quality is higher, and manual quality inspection has not been able to meet the speed of product production, so many companies use visual detection equipment for detection; and the visual detection equipment detects the quality of products, to achieve higher product production efficiency and detection precision.

However, in the actual detection process, the visual detection equipment will have detection errors, resulting in reduction in detection precision.

SUMMARY

The objective of an embodiment of this application is to provide visual detection equipment and a verification method thereof, and a camera verification piece, to solve at least the problem that the visual detection equipment has reduction in detection precision.

A technical solution disclosed in an embodiment of this application is described below.

According to a first aspect, an embodiment of this application provides a camera verification piece. The camera verification piece includes a body. The body is provided with a verification structure for detection by visual detection equipment. The verification structure is constructed to adapt to a to-be-detected structure on a to-be-detected part.

According to the camera verification piece of the embodiment of this application, after long-time detection or adjustment of the visual verification equipment, the verification structure of the camera verification piece is disposed in a view field of a camera, after the camera performs imaging analysis on the verification structure of the camera verification piece, structural parameters on the verification structure are obtained, and the obtained structural parameters are compared with predetermined structural parameters. If the obtained structural parameters are the same as the predetermined structural parameters or within a reasonable error range of the predetermined structural parameters, it means that the obtained structural parameters are not distorted, the imaging quality of the camera is good, and the camera is in a normal working state. If the deviation between the obtained structural parameters and the predetermined structural parameters is large, it means that the obtained structural parameters are distorted, the imaging quality of the camera becomes poor, and the camera is in an abnormal working state. At this time, workers can timely need to adjust or replace the camera, the imaging quality of the camera is improved, and detection errors of the visual detection equipment are corrected timely, thereby solving the problem that detection accuracy and detection precision of the visual detection equipment are reduced, and making the visual detection equipment still have good detection accuracy and detection precision after long-time detection or adjustment.

In one embodiment, a shape of the body is constructed to adapt to a shape of the to-be-detected part.

According to the camera verification piece of the embodiment of this application, the body can better simulate the to-be-detected part, so that the working state of the camera can be more accurately judged, and the verification accuracy is improved.

In one embodiment, a position of the verification structure on the body can adapt to a position of the to-be-detected structure on the to-be-detected part.

According to the camera verification piece of the embodiment of this application, the verification structure can better simulate the to-be-detected structure, so that the working state of the camera can be more accurately judged, and the verification accuracy is improved.

In one embodiment, a shape of the verification structure adapts to a shape of the to-be-detected structure.

According to the camera verification piece of the embodiment of this application, the verification structure can better simulate the to-be-detected structure, so that the working state of the camera can be more accurately judged, and the verification accuracy is improved.

In one embodiment, the verification structure includes at least one of a verification hole, a verification groove and a verification protrusion.

According to the camera verification piece of the embodiment of this application, the verification structure adopts a structural form of the verification hole, the verification groove and the verification protrusion, the structure is simple, and processing and production of the verification structure are facilitated.

In one embodiment, the body is provided with a weight reduction slot, and the weight reduction slot is disposed avoiding the verification structure.

According to the camera verification piece of the embodiment of this application, the weight reduction slot can reduce the weight of the body, the camera verification piece can be taken up with less time and effort, and the camera verification operation is also lighter.

In one embodiment, the body includes a body block and an insert block, the insert block is mounted on the body block, and the verification structure is formed on the insert block.

According to the camera verification piece of the embodiment of this application, the camera verification piece adopts a split structure of the body block and the insert block, so that the body block and the insert block can be made of different materials. The insert block can be made of materials with high processing precision, so that the verification structure processed on the insert block has a small processing error, the structural parameters of the verification structure can be closer to the predetermined structural parameters, and the state judgment accuracy of the camera is improved. In addition, the body block can be made of low-cost materials, which is conducive to reducing the production cost of the camera verification piece.

In one embodiment, the body block is an aluminum block, and the insert block is a die steel block.

According to the camera verification piece of the embodiment of this application, the material of the body block is aluminum, the aluminum is light and inexpensive, which is conducive to reducing the quality and production cost of the camera verification piece, the camera verification piece is taken up more conveniently, and the state verification operation of the camera is more time-saving and labor-saving. In addition, the material of the insert block is die steel, because the cold and heat deformation of the die steel is small, on the one hand, when processing the verification structure, the processing dimensional error of the verification structure is small, and the dimensional precision is high, which is conducive to improving the state judgment accuracy of the camera. On the other hand, the cold and heat deformation of the die steel is small, the dimensional stability of the verification structure is good under environments of different temperatures, and the state judgment error of the camera can also be reduced. In addition, the die steel has wear resistance and corrosion resistance, which can also meet the needs of long-time use.

In one embodiment, an oxide layer is formed on a surface of the aluminum block.

According to the camera verification piece of the embodiment of this application, the oxide film has a protective effect on the aluminum block, thus prolonging the service life of the aluminum block and thus prolonging the service life of the camera verification piece.

In one embodiment, the verification structure further includes a central hole and a plurality of detection holes, and the plurality of detection holes are annularly disposed outside the central hole.

According to the camera verification piece of the embodiment of this application, whether 2D imaging and 3D imaging of the camera are in a normal state can be detected. At the same time, the detection holes are annularly disposed outside the central hole, the camera then performs imaging analysis on each detection hole, so that the places around the central hole can be verified, and thus whether the camera is in a normal state when imaging different places around the central hole is judged. More locations can be verified, the comprehensiveness is good, and the accuracy is high.

In one embodiment, depths of the plurality of detection holes are same or different.

According to the camera verification piece of the embodiment of this application, the depths of the detection holes are the same, so that processing and production is simple; and the depths of the detection holes are different, so that different depth parameters can be obtained, whether the camera is in a normal state when imaging the detection holes of different depths is known, the verification comprehensiveness is good, and the accuracy is high.

In one embodiment, the depths of the detection holes increase or decrease gradually along a circumferential direction of the central hole.

According to the camera verification piece of the embodiment of this application, the depths of the detection holes are the same, so that processing and production is simple; and the depths of the detection holes are different, so that different depth parameters can be obtained, whether the camera is in a normal state when imaging the detection holes of different depths is known, the verification comprehensiveness is good, and the accuracy is high.

In one embodiment, the depth of each detection hole is greater than precision of the camera and within a depth-of-field range of the camera.

According to the camera verification piece of the embodiment of this application, the camera can clearly image the depths of the detection holes, so as to obtain the depths of the detection holes, thus realizing the comparison between the obtained depths and predetermined depths, and completing the accurate state judgment of the camera.

In one embodiment, a structural parameter with the highest quality requirement of the to-be-detected structure is a first structural parameter, and the depth of at least one of the detection holes is located within an error range of the first structural parameter.

According to the camera verification piece of the embodiment of this application, detection of the depths of the detection holes within the error range of the first structural parameter can simulate the detection of the smallest defect on the to-be-detected structure, so as to judge the state of the camera when detecting the smallest defect on the to-be-detected structure. If the camera is in a normal state when detecting the smallest defect on the to-be-detected structure, then it means that the camera can also accurately obtain all the structural parameters and improve the verification accuracy.

In one embodiment, the depth of at least one of the detection holes is located outside the error range of the first structural parameter.

According to the camera verification piece of the embodiment of this application, the depths of the detection holes outside the error range of the first structural parameter can simulate the condition that the first structural parameter of the to-be-detected structure does not meet the quality requirements, so as to judge whether the camera is in a normal state for the to-be-detected structure that does not meet the quality requirements, so that the state verification comprehensiveness of the camera is better, and the accuracy is higher.

In one embodiment, the verification structure further includes a plurality of detection grooves, and the detection grooves are arranged at intervals.

According to the camera verification piece of the embodiment of this application, the verification structure adopts a structural form that the detection grooves are arranged at intervals, the structure is simple, and processing and production are facilitated.

In one embodiment, the detection grooves include a plurality of first detection grooves and a plurality of second detection grooves, the first detection grooves are arranged along a length direction of the body at intervals, and the second detection grooves are arranged along a width direction of the body at intervals.

According to the camera verification piece of the embodiment of this application, the camera verification piece can simulate the detection of a plurality of to-be-detected structures on the to-be-detected part. The camera verification piece has a wide range of verification and better practicality.

In one embodiment, depths of the plurality of detection grooves are same or different.

According to the camera verification piece of the embodiment of this application, the depths of the detection grooves are same, and processing and production are facilitated. The depths of the detection grooves are different, so that the camera can perform imaging analysis on the detection grooves of different depths, different groove depth parameters are obtained, whether the camera is in a normal state for the detection grooves of different depths is known, the verification comprehensiveness is good, and the accuracy is high.

In one embodiment, the depths of the detection grooves increase or decrease gradually along an arrangement direction of the detection grooves.

According to the camera verification piece of the embodiment of this application, the camera can perform imaging analysis on more detection grooves of different depths, more different groove depth parameters are obtained, thus whether the camera is in a normal state for the detection grooves of different depths is known, the verification comprehensiveness is good, and the accuracy is high.

In one embodiment, the depth of each detection groove is greater than precision of the camera and within a depth-of-field range of the camera.

According to the camera verification piece of the embodiment of this application, the camera can clearly image the depths of the detection grooves, so as to obtain the depths of the detection grooves, thus realizing the comparison between the obtained depths and predetermined depths, and completing the accurate state judgment of the camera.

In one embodiment, a structural parameter with the highest quality requirement of the to-be-detected structure is a second structural parameter, and the depth of at least one of the detection grooves is located within an error range of the second structural parameter.

According to the camera verification piece of the embodiment of this application, detection of the depths of the detection grooves within the error range of the second structural parameter can simulate the detection of the smallest defect on the to-be-detected structure, so as to judge the state of the camera when detecting the smallest defect on the to-be-detected structure. If the camera is in a normal state when detecting the smallest defect on the to-be-detected structure, then it means that the camera can also accurately obtain all the structural parameters and improve the verification accuracy.

In one embodiment, the depth of at least one of the detection grooves is located outside the error range of the second structural parameter.

According to the camera verification piece of the embodiment of this application, the depths of the detection grooves outside the error range of the second structural parameter can simulate the condition that the second structural parameter of the to-be-detected structure does not meet the quality requirements, so as to judge whether the camera is in a normal state when detecting the to-be-detected structure that does not meet the quality requirements, so that more state verification parameters of the camera are realized, the state verification comprehensiveness is better, and the accuracy is higher.

According to a second aspect, an embodiment of this application provides visual detection equipment, including the camera verification piece.

According to the visual detection equipment, the camera verification piece is adopted, the state of a camera can be timely verified by means of the camera verification piece, workers can timely and conveniently correct detection errors of the visual detection equipment, the problem that detection accuracy and detection precision of the visual detection equipment are reduced is solved, and thus the visual detection equipment still has good detection accuracy and detection precision after long-time detection or adjustment.

According to a third aspect, an embodiment of this application provides a verification method of visual detection equipment, wherein the visual detection equipment is adopted, and the verification method of the visual detection equipment includes the following steps:

disposing a verification structure of a camera verification piece in a view field of a camera of the visual detection equipment;

obtaining, by the visual detection equipment, structural parameters of the verification structure; and comparing the obtained structural parameters with predetermined structural parameters, if the obtained structural parameters are the same as the predetermined structural parameters or within a reasonable error range of the predetermined structural parameters, the camera being in a normal working state; and if the obtained structural parameters are different from the predetermined structural parameters or outside the reasonable error range of the predetermined structural parameters, the camera being in an abnormal working state.

According to the verification method of the visual detection equipment of the embodiment of this application, the visual verification equipment needs verification, the verification structure of the camera verification piece is disposed in a view field of the camera, after the camera performs imaging analysis on the verification structure of the camera verification piece, the structural parameters on the verification structure are obtained, and the obtained structural parameters are compared with the predetermined structural parameters. If the obtained structural parameters are the same as the predetermined structural parameters or within the reasonable error range of the predetermined structural parameters, it means that the obtained structural parameters are not distorted, the imaging quality of the camera is good, and the camera is in a normal working state. If the obtained structural parameters are different from the predetermined structural parameters or outside the reasonable error range of the predetermined structural parameters, it means that the obtained structural parameters are distorted, the imaging quality of the camera becomes poor, and the camera is in an abnormal working state. At this time, workers can timely need to adjust or replace the camera, the imaging quality of the camera is improved, and detection errors of the visual detection equipment are corrected timely, thereby solving the problem that detection accuracy and detection precision of the visual detection equipment are reduced, and making the visual detection equipment still have good detection accuracy and detection precision after long-time detection or adjustment.

BRIEF DESCRIPTION OF DRAWINGS

To describe the technical solutions in embodiments of this application more clearly, the following outlines the drawings to be used in embodiments. Evidently, the drawings outlined below are merely some embodiments of this application. A person of ordinary skill in the art may derive other drawings from such drawings without making any creative efforts.

REFERENCE NUMERALS IN FIGURES

Figure 1:
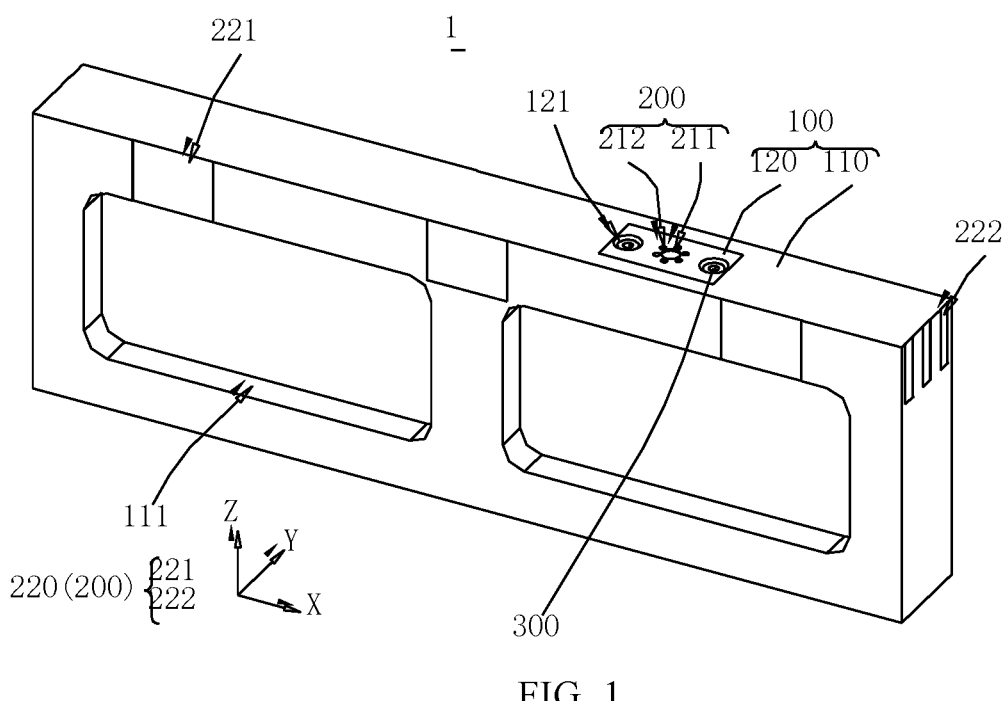
FIG. 1 is a schematic diagram of a three-dimensional structure of a camera verification piece according to an embodiment of this application.

1000, vehicle; 1100, battery; 1200, controller; 1300, motor; 10, case; 11, first portion; 12, second portion; 20, battery cell; 21, end cover; 201, liquid injection hole; 2011, large-size segment; 22, housing; 23, electrode assembly; 24, sealing nail; 1, camera verification piece; 100, body; 110, body block; 111, weight reduction slot; 120, insert block; 121, connection hole; 200, verification structure; 211, central hole; 212, detection hole; 220, detection groove; 221, first detection groove; 222, second detection groove; 300, fastener; 400, visual detection equipment; 411, carrier; 412, support mechanism; 413, camera; 414, light source assembly; 421, first support; 422, first camera; 423, second camera; 424, first light source; 425, second light source; 431, second support; 432, third camera; 433, fourth camera; 434, third light source; and 435, fourth light source.

DETAILED DESCRIPTION OF EMBODIMENTS

Embodiments of this application are described in detail below, and examples of the embodiments are shown in the accompanying drawings, wherein the same or similar reference numerals represent the same or similar elements or elements with the same or similar functions all the time. The embodiments described below by reference to the accompanying drawings are exemplary and are intended to be used to explain this application and are not to be construed as limiting this application.

In the description of this application, it is to be understood that a direction or a positional relationship indicated by the terms such as "length", "width", "up", "down", "front", "back", "left", "right", "vertical", "horizontal", "top", "bottom", "inside", and "outside" is a direction or positional relationship based on the illustration in the drawings, and is merely intended to describe the embodiments and simplify the description but without indicating or implying that the indicated apparatus or component is necessarily located in the specified direction or constructed or operated in the specified direction. Therefore, such terms do not constitute any limitation on this application.

In addition, the terms "first" and "second" are used merely for ease of description, but without indicating or implying relative importance or implicitly specifying the quantity of technical features. Thus, the features qualified with "first" and "second" may explicitly or implicitly include one or more of these features. In the description of this application, unless otherwise expressly specified, "a plurality of" means two or more.

In this application, unless otherwise expressly specified and limited, terms "mounted", "connected with", "connected to", "fixed", etc. may be understood in a broad sense, for example, as a fixed connection, as a removable connection, or as an integral part; as a mechanical connection, or as an electrical connection; as a direct connection, or as an indirect connection through an intermediate medium, or as an internal connection of two elements or as an interaction relationship between two elements. A person of ordinary skill in the art may understand the specific meanings of such terms depending on specific situations.

It should also be noted that the same component or the same part is indicated by the same reference numerals in the drawings in the embodiment of this application. For the same parts in the embodiment of this application, the reference numerals in the drawings may be marked with only one of the parts or components for example, and it should be understood that for other same parts or components, the reference numerals in the drawings are equally applicable.

In this application, the term "an embodiment," "some embodiments," "example," "specific example," or "some examples" means that the specific features, structures, materials, or characteristics described in combination with the embodiment or example are included in at least one embodiment or example of this application. In this specification, schematic expressions of the above terms do not have to be directed to the same embodiments or examples. Moreover, the specific features, structures, materials, or characteristics described may be combined in a suitable manner in any one or more embodiments or examples. In addition, without contradicting each other, a person skilled in the art may combine the different embodiments or examples described in this specification and the features of the different embodiments or examples.

In this disclosure, the phrases "at least one of A, B, and C" and "at least one of A, B, or C" both mean only A, only B, only C, or any combination of A, B, and C.

Visual detection equipment is machine equipment developed to detect defects in product appearance and measure dimensions based on actual needs. The basic components of the visual detection equipment mainly include light source, camera and equipment mechanism parts. The detection principle of the visual detection equipment is as follows: after a product is moved into the view field of a camera, the camera performs imaging analysis on the product under the illumination of a light source, so as to obtain structural parameters (such as a height, length, position, area, etc.), and then, according to whether the structural parameters are within a qualified error range, the conclusion of judging whether the quality of the product meets the requirements is obtained. In this way, the quality detection of the product is achieved.

After the visual detection equipment performs detection test for a long time or is adjusted due to engineering changes, product changes and other factors, the imaging quality of the camera may be changed due to position change of the camera, camera parameter change, camera failure and other circumstances. When the imaging quality of the camera becomes poor, the structural parameters obtained in imaging analysis of the camera have large errors, resulting in the condition of misjudgment of the visual detection equipment, and then resulting in the problem that the detection accuracy and detection precision of the visual detection equipment are reduced.

In order to solve the above problem, a camera verification piece is designed. After long-time detection or adjustment of the visual verification equipment, a verification structure of the camera verification piece is disposed in the view field of the camera, after the camera performs imaging analysis on the verification structure of the camera verification piece, structural parameters on the verification structure are obtained, and the obtained structural parameters are compared with predetermined structural parameters. If the obtained structural parameters are the same as the predetermined structural parameters or within a reasonable error range of the predetermined structural parameters, it means that the obtained structural parameters are not distorted, the imaging quality of the camera is good, and the camera is in a normal working state. If the deviation between the obtained structural parameters and the predetermined structural parameters is large, it means that the obtained structural parameters are distorted, the imaging quality of the camera becomes poor, and the camera is in an abnormal working state. At this time, workers can timely need to adjust or replace the camera, the imaging quality of the camera is improved, and detection errors of the visual detection equipment are corrected timely, thereby solving the problem that detection accuracy and detection precision of the visual detection equipment are reduced, and making the visual detection equipment still have good detection accuracy and detection precision after long-time detection or adjustment.

The visual detection equipment can detect a variety of products, such as electronic component defect detection, precision part detection, fastener size and appearance detection, inductor-resistor scratches, missing screws and nuts, etc.

In one embodiment of this application, as shown in FIG. 1, a camera verification piece 1 is provided. The camera verification piece includes a body 100. The body 100 is provided with a verification structure 200 for detection by visual detection equipment 400. The verification structure 200 is constructed to adapt to a to-be-detected structure on a to-be-detected part.

The body 100 is a body part of the camera verification piece 1.

The verification structure 200 is a structure processed on the body 100 according to predetermined structural parameters. Specific values of the predetermined structural parameters may be set according to the actual detection needs and are not limited here.

The to-be-detected part is a part to be detected by the visual detection equipment 400.

The to-be-detected structure is a structure formed on the to-be-detected part and to be detected by the visual detection equipment 400.

The verification structure 200 is constructed to adapt to the to-be-detected structure on the to-be-detected part. It is understood that a shape and size of the verification structure 200 can be the same or similar to a shape and size of the to-be-detected structure, or a position of the verification structure 200 relative to the camera at the time of detection can be the same or similar to that of the to-be-detected structure, so that the state of the camera verification piece 1 photographed by the camera can better simulate the state of the to-be-detected part photographed by the camera, and accordingly the state of the camera can be more accurately judged and the verification accuracy of the camera can be improved.

According to the camera verification piece 1 of the embodiment of this application, after long-time detection or adjustment of the visual verification equipment 400, the verification structure 200 of the camera verification piece 1 is disposed in a view field of a camera, after the camera performs imaging analysis on the verification structure 200 of the camera verification piece 1, structural parameters on the verification structure 200 are obtained, and the obtained structural parameters are compared with the predetermined structural parameters. If the obtained structural parameters are the same as the predetermined structural parameters or within a reasonable error range of the predetermined structural parameters, it means that the obtained structural parameters are not distorted, the imaging quality of the camera is good, and the camera is in a normal working state. If the deviation between the obtained structural parameters and the predetermined structural parameters is large, it means that the obtained structural parameters are distorted, the imaging quality of the camera becomes poor, and the camera is in an abnormal working state. At this time, workers can timely need to adjust or replace the camera, the imaging quality of the camera is improved, and detection errors of the visual detection equipment 400 are corrected timely, thereby solving the problem that detection accuracy and detection precision of the visual detection equipment 400 are reduced, and making the visual detection equipment 400 still have good detection accuracy and detection precision after long-time detection or adjustment.

In one embodiment of this application, the shape of the body 100 of the provided camera verification piece 1 is constructed to adapt to a shape of the to-be-detected part. It is understood that the shape of the body 100 is the same or similar to the shape of the to-be-detected part, so that the state of the camera verification piece 1 photographed by the camera can better simulate the state of the to-be-detected part photographed by the camera, and accordingly the state of the camera can be more accurately judged and the verification accuracy of the camera can be improved.

In one embodiment of this application, a position of the verification structure 200 of the provided camera verification piece 1 on the body 100 can adapt to a position of the to-be-detected structure on the to-be-detected part. It is understood that the position of the verification structure 200 on the body 100 is the same or similar to the position of the to-be-detected structure on the to-be-detected part, so that the state of the verification structure 200 of the camera verification piece 1 photographed by the camera can better simulate the state of the to-be-detected structure of the to-be-detected part photographed by the camera, and accordingly the state of the camera can be more accurately judged and the verification accuracy of the camera can be improved.

In one embodiment, the shape of the verification structure 200 of the provided camera verification piece 1 is constructed to adapt to the shape of the to-be-detected structure.

The shape of the verification structure 200 is constructed to adapt to the shape of the to-be-detected part. It is understood that the shape of the verification structure 200 is the same or similar to the shape of the to-be-detected structure, so that the verification structure 200 can better simulate the to-be-detected structure, and accordingly the working state of the camera can be more accurately judged and the verification accuracy can be improved.

In one embodiment of this application, as shown in FIG. 1, the verification structure 200 of the provided camera verification piece 1 includes at least one of a verification hole, a verification groove and a verification protrusion. It is understood that the verification structure 200 may be the verification hole formed in the body 100, or the verification groove formed in the body 100, or the verification protrusion disposed on the body 100, or a combination of any two of the verification hole, the verification groove and the verification protrusion disposed on the body 100, or the verification hole, the verification groove and the verification protrusion disposed on the body 100. The verification hole is a round hole, triangular hole, square hole, etc., the verification groove may be a long groove, curved groove, etc., and the verification protrusion maybe a long protrusion, curved protrusion, etc.

The verification structure 200 adopts a structural form of the verification hole, the verification groove and the verification protrusion, the structure is simple, and processing and production of the verification structure 200 are facilitated.

In one embodiment of this application, as shown in FIG. 1, the body 100 of the provided camera verification piece 1 is provided with a weight reduction slot 111, and the weight reduction slot 111 is disposed avoiding the verification structure 200.

The weight reduction slot 111 is a slot formed in the body 100 and disposed avoiding the verification structure 200.

The weight reduction slot 111 is disposed avoiding the verification structure 200. It is understood that the verification structure 200 and the weight reduction slot 111 are located at two different positions on the body 100. The verification structure 200 and the weight reduction slot 111 do not interfere with each other, the condition that the weight reduction slot 111 affects the verification structure 200 is reduced, and the state detection accuracy of the camera is improved.

The weight reduction slot 111 can reduce the weight of the body 100, the camera verification piece 1 can be taken up with less time and effort, and the camera verification operation is also lighter.

In another embodiment, the quantity of weight reduction slots 111 may be multiple, and the specific quantity may be set according to the actual needs and is not limited here.

Figure 2:
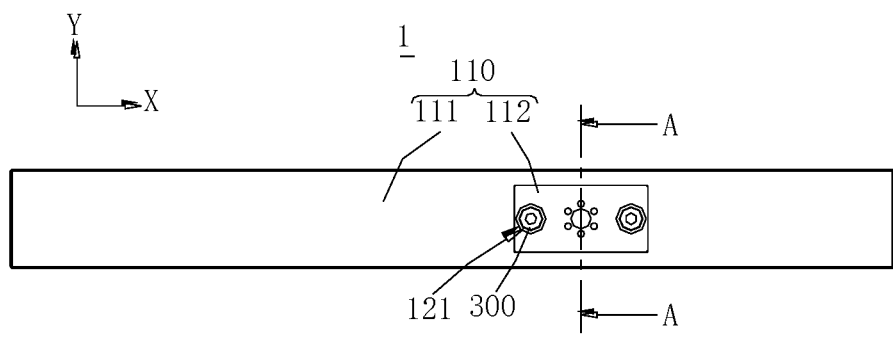
FIG. 2 is a schematic structural diagram of a camera verification piece from a perspective according to an embodiment of this application.
Figure 3:
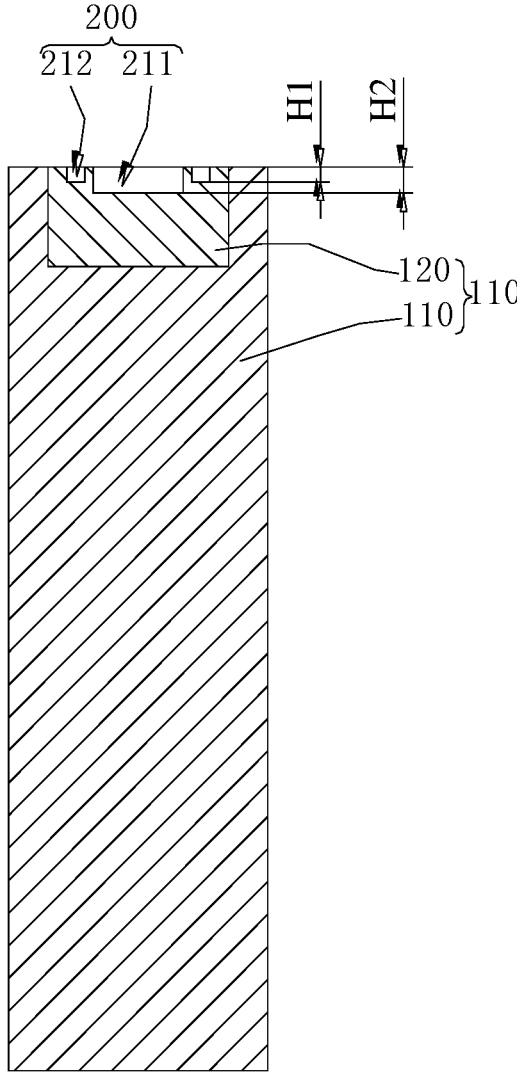
FIG. 3 is a cutaway view along a line A-A in FIG. 2.
Figure 4:
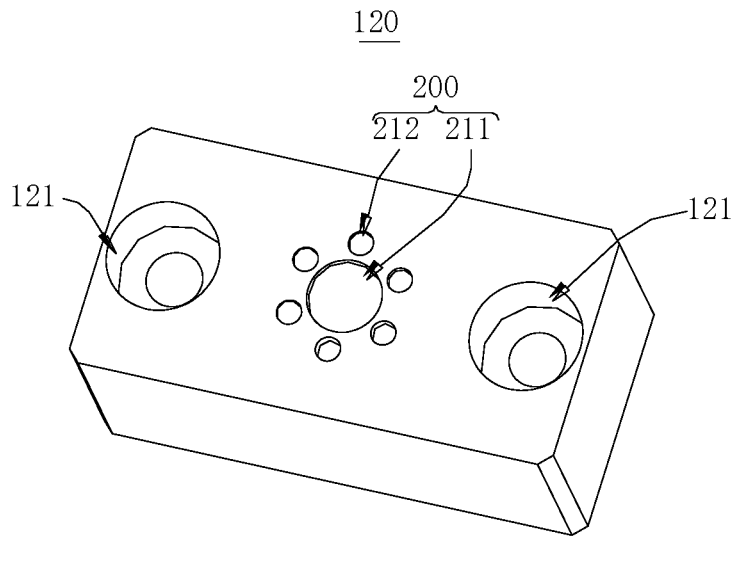
FIG. 4 is a schematic structural diagram of an insert block according to an embodiment of this application.

In one embodiment of this application, as shown in FIG. 2, FIG. 3 and FIG. 4, the body 100 of the provided camera verification piece 1 includes a body block 110 and an insert block 120, the insert block 120 is mounted on the body block 110, and the verification structure 200 is formed on the insert block 120.

The body block 110 is a body part of the camera verification piece 1.

The insert block 120 is a part where the verification structure 200 is formed on the camera verification piece 1.

The insert block 120 is mounted on the body block 110. It is understood that the insert block 120 may be connected to the body block 110 by a screw structure, a snap structure, an adhesive structure, a magnetic adsorption structure, or other structure that can connect and fix two components.

The camera verification piece 1 adopts a split structure of the body block 110 and the insert block 120, so that the body block 110 and the insert block 120 can be made of different materials. The insert block 120 can be made of materials with high processing precision, so that the verification structure 200 processed on the insert block 120 has a small processing error, the structural parameters of the verification structure 200 can be closer to the predetermined structural parameters, and the state judgment accuracy of the camera is improved. In addition, the body block 110 can be made of low-cost materials, which is conducive to reducing the production cost of the camera verification piece 1.

In one embodiment of this application, the body block 110 of the provided camera verification piece 1 is an aluminum block, and the insert block 120 is a die steel block.

The body block 110 is the aluminum block. It is understood that the body block 110 is made of aluminum.

The insert block 120 is the die steel lock. It is understood that the insert block 120 is made of die steel.

The material of the body block 110 is aluminum, the aluminum is light and inexpensive, which is conducive to reducing the quality and production cost of the camera verification piece 1, the camera verification piece 1 is taken up more conveniently, and the state verification operation of the camera is more time-saving and labor-saving. In addition, the material of the insert block 120 is die steel, because the cold and heat deformation of the die steel is small, on the one hand, when processing the verification structure 200, the processing dimensional error of the verification structure 200 is small, and the dimensional precision is high, which is conducive to improving the state judgment accuracy of the camera. On the other hand, the cold and heat deformation of the die steel is small, the dimensional stability of the verification structure 200 is good under environments of different temperatures, and the state judgment error of the camera can also be reduced. In addition, the die steel has wear resistance and corrosion resistance, which can also meet the needs of long-time use.

In one embodiment of this application, an oxide layer is formed on a surface of the aluminum block of the provided camera verification piece 1.

The oxide layer is a dense oxide film formed on the surface of the aluminum block.

The oxide film has a protective effect on the aluminum block, thus prolonging the service life of the aluminum block and thus prolonging the service life of the camera verification piece 1.

In another embodiment, the surface of the aluminum block is treated by black anodizing to obtain the oxide layer. The oxide layer enhances the surface hardness and wear resistance of the aluminum block, thereby effectively prolonging the service life of the camera verification piece 1.

In one embodiment of this application, as shown in FIG. 2 and FIG. 3, the verification structure 200 of the provided camera verification piece 1 further includes a central hole 211 and a plurality of detection holes 212. The plurality of detection holes 212 are annularly disposed outside the central hole 211.

The verification structure 200 adopts a structural form of the central hole 211 and the plurality of detection holes 212, which has a simple structure and is convenient to process and produce. In addition, the central hole 211 and the plurality of detection holes 212 form a ring-like structure, which can be suitable for camera verification of an annular to-be-detected structure.

In the specific verification, after the camera performs imaging analysis on the central hole 211 and each detection hole 212, shape parameters of the central hole 211 and shape parameters and depth parameters of each detection hole 212 are obtained, and then the obtained shape parameters are compared with predetermined shape parameters, so as to judge whether 2D imaging of the camera is in a normal state. At the same time, the obtained depth parameters are compared with predetermined depth parameters, so as to judge whether 3D imaging of the camera is in a normal state. At the same time, the detection holes 212 are annularly disposed outside the central hole 211, the camera then performs imaging analysis on each detection hole 212, so that the places around the central hole 211 can be verified, and thus whether the camera is in a normal state when imaging different places around the central hole 211 is judged. More locations can be verified, the comprehensiveness is good, and the accuracy is high.

In one embodiment of this application, depths H1 of the plurality of detection holes 212 of the provided camera verification piece 1 are same or different.

The depths H1 of the plurality of detection holes 212 are same. It is understood that the depths of all the detection holes 212 are same, and processing and production are simple.

The depths H1 of the plurality of detection holes 212 are different. It is understood that the depth of at least one detection hole 212 is different from the depths H1 of the other detection holes 212, so that the camera can obtain images of the detection holes 212 of different depths H1, and accordingly different depth parameters can be obtained, whether the camera is in a normal state when imaging the detection holes 212 of different depths is known, the verification comprehensiveness is good, and the accuracy is high.

In another embodiment, an inside diameter of the verification hole may be same or different, and is specifically determined by rotation according to the actual conditions, which is not limited here.

In one embodiment of this application, the depths of the detection holes 212 of the provided camera verification piece 1 increase or decrease gradually along a circumferential direction of the central hole 211.

The circumferential direction of the central hole 211 refers to a circumference direction of the central hole 211.

The depths of the detection holes 212 gradually increase along the circumferential direction of the central hole 211. It is understood that the depths H1 of the detection holes 212 are different and gradually increase along the circumferential direction of the central hole 211, so that the camera can perform imaging analysis on more detection holes 212 of different depths, and accordingly different depth parameters can be obtained, whether the camera is in a normal state when imaging the detection holes 212 of different depths is known, the verification comprehensiveness is good, and the accuracy is high.

The depths H1 of the detection holes 212 gradually decrease along the circumferential direction of the central hole 211. It is understood that the depths H1 of the detection holes 212 are different and gradually decrease along the circumferential direction of the central hole 211, so that the camera can perform imaging analysis on more detection holes 212 of different depths, and accordingly different depth parameters can be obtained, whether the camera is in a normal state when imaging the detection holes 212 of different depths is known, more verification parameters are achieved, the comprehensiveness is better, and the accuracy is high.

In one embodiment of this application, the depth of each detection hole 212 of the provided camera verification piece 1 is greater than precision of the camera and within a depth-of-field range of the camera.

The precision of the camera refers to a size of each pixel in an image.

The depth-of-field range of the camera refers to a range of a distance before and after a subject measured by the imaging in which the camera can obtain a clear image.

According to the camera verification piece 1 of the embodiment of this application, the depth H1 of each detection hole 212 is greater than the precision of the camera and within the depth-of-field range of the camera, so that the camera can clearly image the depths of the detection holes 212, so as to obtain the depths of the detection holes 212, thus realizing the comparison between the obtained depths and predetermined depths, and completing the accurate state judgment of the camera.

In one embodiment of this application, according to the provided camera verification piece 1, a structural parameter with the highest quality requirement of the to-be-detected structure is a first structural parameter, and the depth H1 of at least one of the detection holes 212 is located within an error range of the first structural parameter.

The structural parameter with the highest quality requirement of the to-be-detected structure refers to a structural parameter corresponding to the smallest defect on the to-be-detected structure in all structural parameters needing to be obtained in the to-be-detected structure, namely the first structural parameter.

The error range of the first structural parameter refers to a collection of the first structural parameter that can meet the quality requirements.

The depth H1 of at least one of the detection holes 212 is within the error range of the first structural parameter. It is understood that the depths H1 of the detection holes 212 may also be entirely within the error range of the first structural parameter, or the depths H1 of part of the detection holes 212 may be within the error range of the first structural parameter.

According to the camera verification piece 1 of the embodiment of this application, detection of the depths H1 of the detection holes 212 within the error range of the first structural parameter can simulate the detection of the smallest defect on the to-be-detected structure, so as to judge the state of the camera when detecting the smallest defect on the to-be-detected structure. If the camera is in a normal state when detecting the smallest defect on the to-be-detected structure, then it means that the camera can accurately obtain all the structural parameters and improve the verification accuracy. If the camera is in an abnormal state when detecting the smallest defect on the to-be-detected structure, the state of the camera can be corrected timely, and the detection accuracy and detection precision of the visual detection equipment 400 are improved.

In one embodiment of this application, according to the provided camera verification piece 1, the depth H1 of at least one of the detection holes 212 is located outside the error range of the first structural parameter.

The depth H1 of at least one of the detection holes 212 is located outside the error range of the first structural parameter. It is understood that the depth H1 of at least one of the detection holes 212 is smaller than the minimum of the error range of the first structural parameter; or, the depth H1 of at least one of the detection holes 212 is greater than the maximum of the error range of the first structural parameter; or, the depth H1 of at least one of the detection holes 212 is smaller than the minimum of the error range of the first structural parameter and the depth H1 of at least another of the detection holes 212 is greater than the maximum of the error range of the first structural parameter.

According to the camera verification piece 1 of the embodiment of this application, the depths H1 of the detection holes 212 outside the error range of the first structural parameter can simulate the condition that the first structural parameter of the to-be-detected structure does not meet the quality requirements, so as to judge whether the camera is in a normal state for the to-be-detected structure that does not meet the quality requirements, so that the state verification comprehensiveness of the camera is better, and the accuracy is higher.

Figure 5:
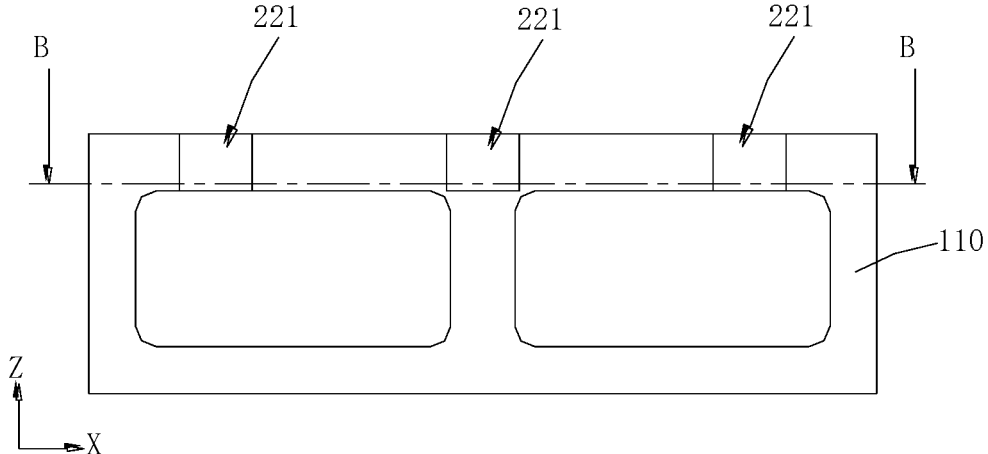
FIG. 5 is a schematic structural diagram of a camera verification piece from another perspective according to an embodiment of this application.
Figure 6:
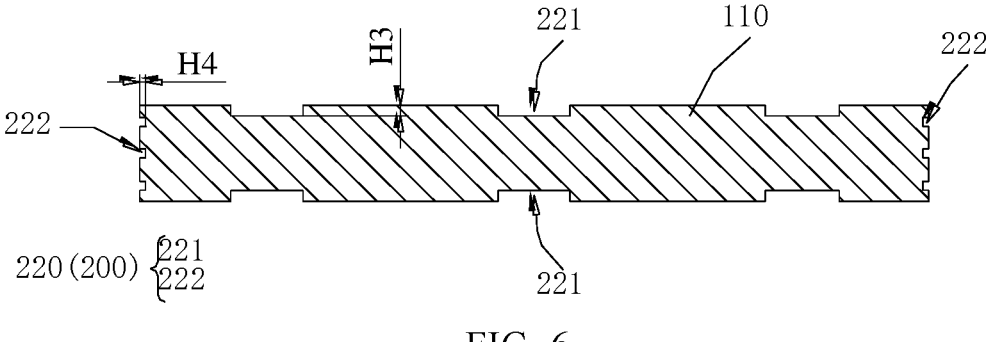
FIG. 6 is a cutaway view along a line B-B in FIG. 5.
Figure 7:
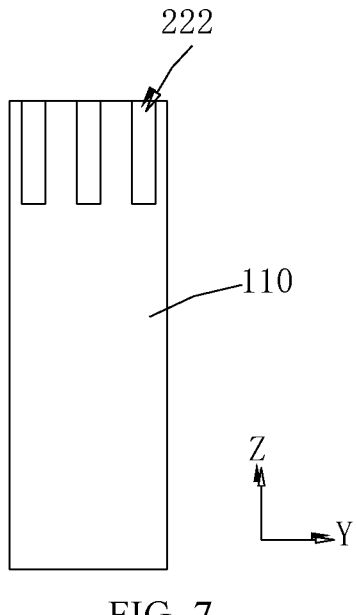
FIG. 7 is a schematic structural diagram of a camera verification piece from yet another perspective according to an embodiment of this application.

In one embodiment of this application, as shown in FIG. 5, FIG. 6 and FIG. 7, the verification structure 200 of the provided camera verification piece 1 further includes a plurality of detection grooves 220. The detection grooves 220 are arranged at intervals.

The verification structure 200 adopts a structural form that the detection grooves 220 are arranged at intervals, the structure is simple, and processing and production are facilitated.

In one embodiment of this application, the detection grooves 220 of the provided camera verification piece 1 include a plurality of first detection grooves 221 and a plurality of second detection grooves 222, the first detection grooves 221 are arranged along a length direction of the body 100 at intervals, and the second detection grooves 222 are arranged along a width direction of the body 100 at intervals.

The first detection grooves 221 can simulate the to-be-detected structure distributed along the length direction (X-axis) of the to-be-detected part, and the second detection grooves 222 can simulate the to-be-detected structure distributed along the width direction (Y-axis) of the to-be-detected part, so that the camera verification piece 1 can simulate the detection of a plurality of to-be-detected structures of the to-be-detected part. The camera verification piece 1 has a wide range of verification and better practicality. In addition, whether the camera is in a normal state at different positions along the length direction of the to-be-detected part can be verified when the camera verifies the plurality of first detection grooves 221, more positions can be verified, the comprehensive is good, and accuracy is high. Similarly, whether the camera is in a normal state at different positions along the width direction of the to-be-detected part can be verified when the camera verifies the plurality of second detection grooves 222, more positions can be verified, the comprehensive is good, and accuracy is high.

In one embodiment of this application, depths of the plurality of detection grooves 220 of the provided camera verification piece 1 are same or different.

The depths of the plurality of detection grooves 220 are same. It is understood that the depths of all the detection grooves 220 are same, the verification structure 200 is simple in structure, and processing and production are simple.

The depths of the plurality of detection grooves 220 are different. It is understood that the depth of at least one of the detection grooves is different from the depths of the other detection grooves 220, so that the camera performs imaging analysis on the detection grooves 220 of different depths, different groove depth parameters are obtained, whether the camera is in a normal state for the detection grooves of different depths is known, more verification parameters are achieved, the verification comprehensiveness is good, and the accuracy is high.

In one embodiment of this application, the depths of the detection grooves 220 of the provided camera verification piece 1 increase or decrease gradually along an arrangement direction of the detection grooves 220.

The depths of the detection grooves 220 gradually increase along the arrangement direction of the detection grooves 220. It is understood that the depths of the detection grooves 220 are all different and gradually increase along the arrangement direction of the detection grooves 220, so that the camera can perform imaging analysis on more detection grooves 220 of different depths, more different depth parameters can be obtained, whether the camera is in a normal state when detecting the detection grooves 220 of different depths is known, more verification parameters are achieved, the comprehensiveness is better, and the accuracy is high.

In one embodiment of this application, the depth of each detection groove 220 of the provided camera verification piece 1 is greater than the precision of the camera and within the depth-of-field range of the camera.

According to the camera verification piece 1 of the embodiment of this application, the depth of each detection groove 220 is greater than the precision of the camera and within the depth-of-field range of the camera, so that the camera can clearly image the depths of the detection grooves 220, so as to obtain the depths of the detection grooves 220, thus realizing the comparison between the obtained depths and predetermined depths, and completing the accurate state judgment of the camera.

In one embodiment of this application, according to the provided camera verification piece 1, a structural parameter with the highest quality requirement of the to-be-detected structure is a second structural parameter, and the depth of at least one of the detection grooves 220 is located within an error range of the second structural parameter.

The structural parameter with the highest quality requirement of the to-be-detected structure refers to a structural parameter corresponding to the smallest defect on the to-be-detected structure in all structural parameters needing to be obtained in the to-be-detected structure, namely the second structural parameter.

The error range of the second structural parameter refers to a collection of the second structural parameter that can meet the quality requirements.

The depth of at least one of the detection grooves 220 is within the error range of the second structural parameter. It is understood that the depths of the detection grooves 220 may also be entirely within the error range of the second structural parameter, or the depths of part of the detection grooves 220 may be within the error range of the second structural parameter.

According to the camera verification piece 1 of the embodiment of this application, detection of the depths of the detection grooves 220 within the error range of the second structural parameter can simulate the detection of the smallest defect on the to-be-detected structure, so as to judge the state of the camera when detecting the smallest defect on the to-be-detected structure. If the camera is in a normal state when detecting the smallest defect on the to-be-detected structure, then it means that the camera can accurately obtain all the structural parameters and improve the verification accuracy. If the camera is in an abnormal state when detecting the smallest defect on the to-be-detected structure, the state of the camera can be corrected timely, and the detection accuracy and detection precision of the visual detection equipment 400 are improved.

In one embodiment of this application, according to the provided camera verification piece 1, the depth of at least one of the detection grooves 220 is located outside the error range of the second structural parameter.

The depth of at least one of the detection grooves 220 is located outside the error range of the second structural parameter. It is understood that the depth of at least one of the detection grooves 220 is smaller than the minimum of the error range of the second structural parameter; or, the depth of at least one of the detection grooves 220 is greater than the maximum of the error range of the second structural parameter; or, the depth of at least one of the detection grooves 220 is smaller than the minimum of the error range of the second structural parameter and the depth of at least another of the detection grooves 220 is greater than the maximum of the error range of the second structural parameter.

According to the camera verification piece of the embodiment of this application, the depths of the detection grooves 220 outside the error range of the second structural parameter can simulate the condition that the second structural parameter of the to-be-detected structure does not meet the quality requirements, so as to judge whether the camera is in a normal state when detecting the to-be-detected structure that does not meet the quality requirements, so that more state verification parameters of the camera are realized, the comprehensiveness is better, and the accuracy is higher.

In order to clearly illustrate the technical solution of the embodiment of this application, the following is an example of a welded structure at a sealing nail 24 of a battery unit and a welded structure at an end cover 21 of the battery unit.

In some cases, electric devices that usually use batteries as a power source may be but not limited to cell phones, tablets, laptops, electric toys, power tools, battery cars, electric vehicles, boats, spacecrafts, etc. The electric toys may include fixed or mobile electric toys, for example, game machines, electric vehicle toys, electric boat toys and electric aircraft toys, etc. Spacecrafts may include aircrafts, rockets, space shuttles and spaceships etc.

The following embodiment is illustrated with an example of a vehicle 1000 as an electric device of an embodiment of this application.

Figure 8:
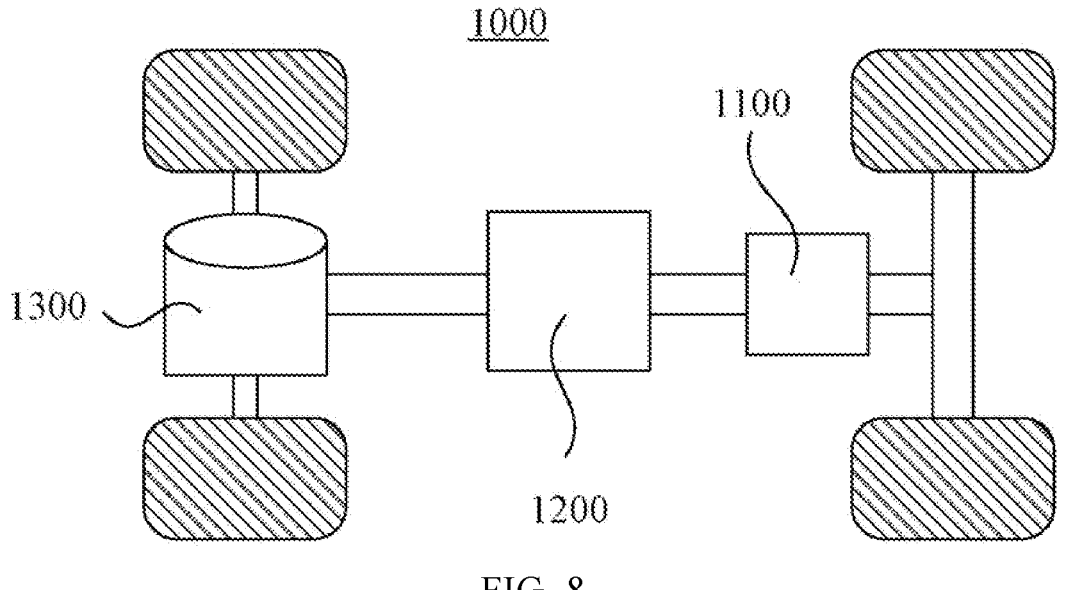
FIG. 8 is a schematic structural diagram of a vehicle according to an embodiment of this application.

Referring to FIG. 8, the vehicle 1000 may be a fuel-fired vehicle, a gas-fired vehicle, or a new energy vehicle, and the new energy vehicle may be a pure electric vehicle, a hybrid vehicle, or an extended program vehicle, etc. The vehicle 1000 is internally provided with a battery 1100. The battery 1100 may be disposed at the bottom or head or tail of the vehicle 1000. The battery 1100 may be configured to supply power for the vehicle 1000. For example, the battery 1100 may be used as an operation power source of the vehicle 1000. The vehicle 1000 may also include a controller 1200 and a motor 1300. The controller 1200 is configured to control the battery 1100 to supply power for the motor 1300, for example, for working electrical needs of the vehicle 1000 for starting, navigating, and running.

In some embodiments of this application, the battery 1100 not only may serve as an operation power source for the vehicle 1000, but also may serve as a driving power source for the vehicle 1000, replacing or partially replacing fuel or natural gas to provide driving power for the vehicle 1000.

Figure 9:
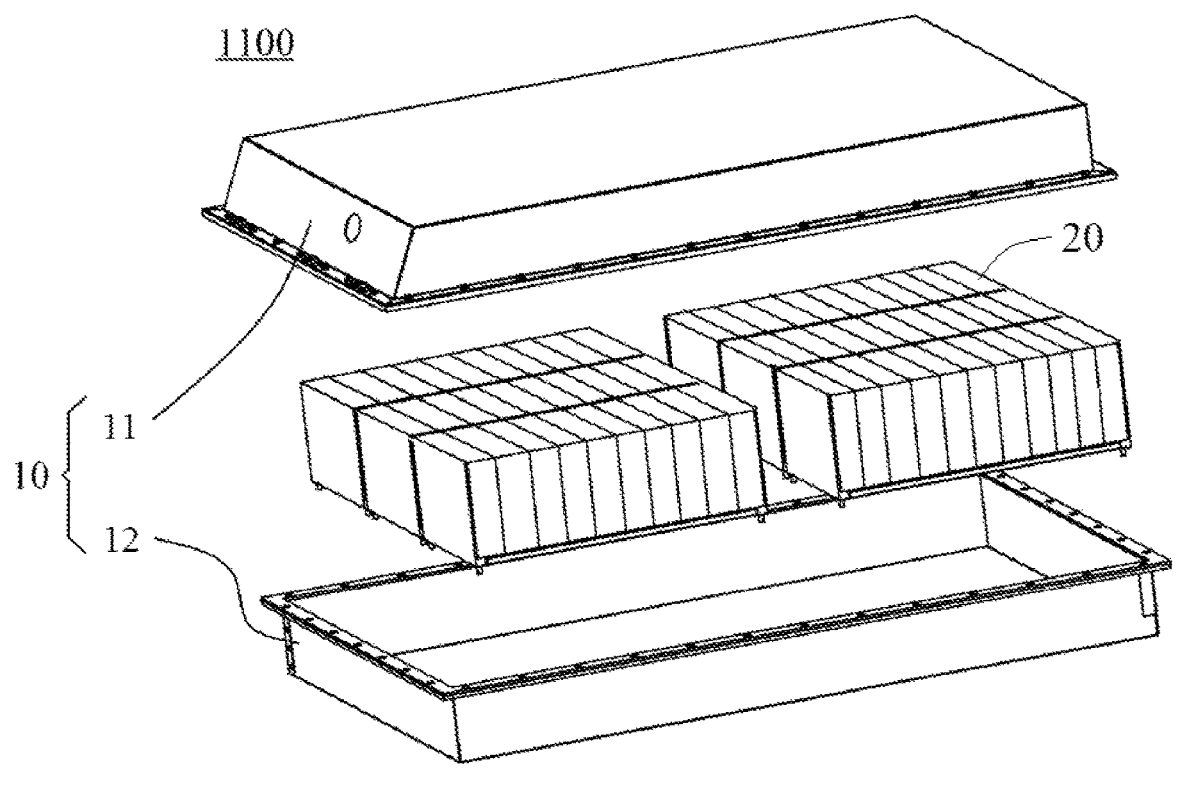
FIG. 9 is a schematic structural diagram of a battery according to an embodiment of this application.

Referring to FIG. 9, as one embodiment of the battery 1100, the battery 1100 includes a case 10 and a battery unit, and the battery unit is contained in the case 10. The case 10 is configured to provide a containing space for the battery unit, and the case 10 may be of various structures. In some embodiments, the case 10 may include a first portion 11 and a second portion 12, the first portion 11 and the second portion 12 are covered with each other, and the first portion 11 and the second portion 12 together define the containing space for containing the battery unit.

In the battery 1100, the battery units may be multiple, and the plurality of battery units may be connected to each other in series or in parallel or in a series-parallel connection manner, and the series-parallel connection manner means that there are both series and parallel connections in the plurality of battery units. Specifically, the battery unit may be a battery cell 20 or a battery module, wherein the battery module is a module component formed by assembling a plurality of battery cells 20.

Each battery cell 20 may be a secondary battery or a primary battery, and may also be a lithium-sulfur, sodium-ion, or magnesium-ion battery, but is not limited to it. Each battery cell 20 may be cylindrical, flat, or rectangular or in other shapes, etc.

As another embodiment of the battery 1100, the battery 1100 may not include the case 10, but a plurality of battery cells 20 are electrically connected and assembled into the electric device after being integrated through a fixing structure.

Figure 10:
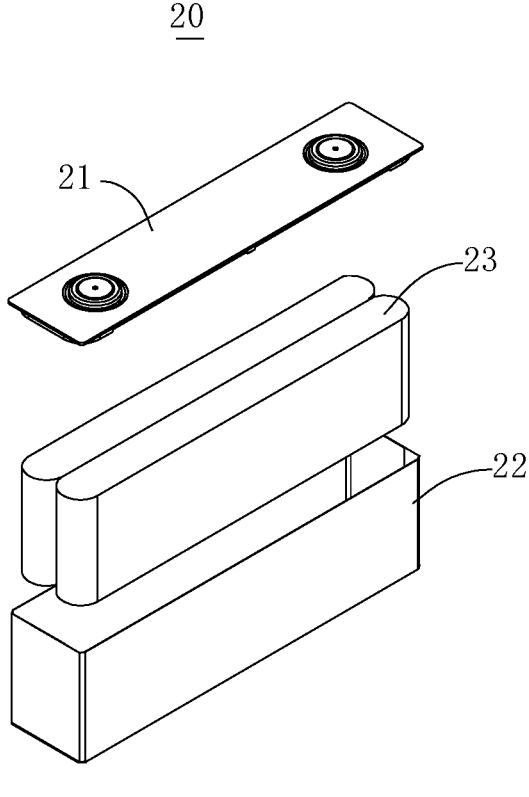
FIG. 10 is a schematic diagram of a decomposed structure of a battery cell according to an embodiment of this application.

Referring to FIG. 10, FIG. 10 is a schematic diagram of a decomposed structure of a battery cell 20 according to some embodiments of this application. The battery cell 20 is the smallest unit that makes up the battery. As shown in FIG. 10, the battery cell 20 includes an end cover 21, a housing 22, an electrode assembly 23, and other functional components. The electrode assembly 23 is mounted inside the housing 22, and the end cover 21 covers an opening of the housing 22 to isolate the electrode assembly 23 from components in an external environment.

In this application, for the convenience of description, the Z axis in the accompanying drawings indicates an up and down direction, the positive direction of the Z axis indicates up, and the negative direction of the Z axis indicates down. The Y axis in the accompanying drawings indicates a left and right direction, the positive direction of the Y axis indicates right, and the negative direction of the Y axis indicates left. The X axis in the accompanying drawings indicates a front and back direction, the positive direction of the X axis indicates front, and the negative direction of the X axis indicates back.

Figure 11:
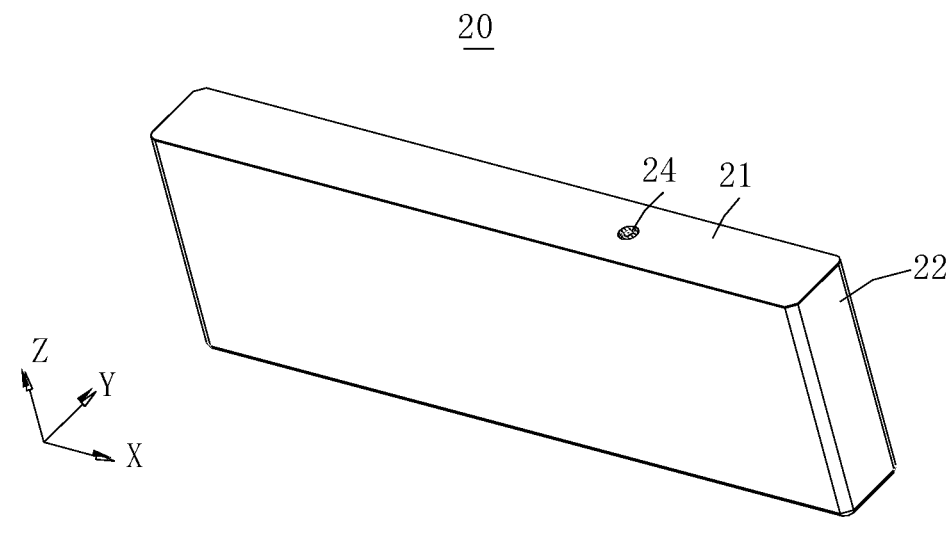
FIG. 11 is a schematic diagram of a three-dimensional structure of a battery cell according to an embodiment of this application.
Figure 12:
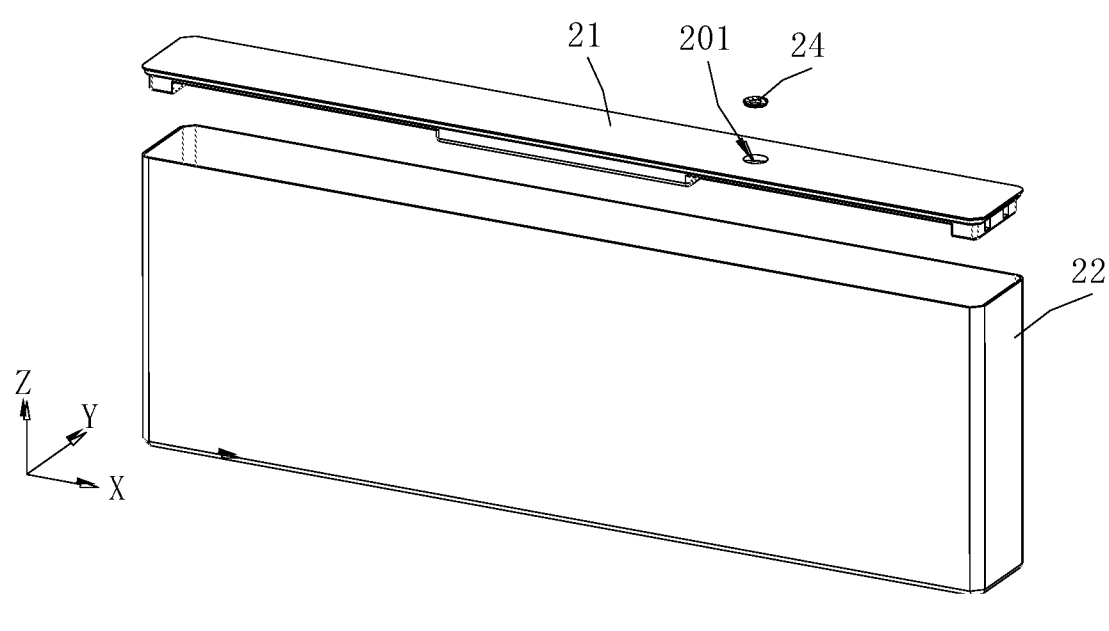
FIG. 12 is a schematic diagram of a decomposed structure of a battery cell according to an embodiment of this application.

In another embodiment, as shown in FIG. 11 and FIG. 12, the end cover 21 is welded to the opening of the housing 22 so that the end cover 21 and the housing 22 form a sealed whole. The welded structure at the end cover 21 refers to a ring of weld formed on the circumference of the end cover 21 and the opening of the housing 22. Please refer together to FIGS. 13 to 15, the end cover 21 is provided with a liquid injection hole 201, the liquid injection hole 201 is a stepped hole, the sealing nail 24 is disposed in a large-size segment 2011 of the stepped hole and abuts against a stepped surface, and the sealing nail 24 is welded in the large-size segment 2011 of the stepped hole to seal the liquid injection hole 201 so as to avoid liquid leakage. The welded structure at the sealing nail 24 refers to a ring of weld formed on the circumference of the sealing nail 24.

In one embodiment, as shown in FIG. 1 and FIG. 2, the top surface of the body block 110 is provided with a mounting hole, the insert block 120 is located in the mounting hole, the insert block 120 is provided with a connection hole 121, a fastener 300 penetrates through the connection hole 121 to be screwed to the body block 110, the fastener 300 may be a screw, bolt and other components to facilitate the connection of the body block 110 and the insert block 120. After the body block 110 and the insert block 120 are connected as the body, the body block 110 has the same external dimensions as the battery cell 20, and the front and rear sides of the body block 110 are hollowed out to form the weight reduction slot 111 so as to reduce the weight of the camera verification piece 1 and also facilitate the taking of the camera verification piece 1.

Figure 13:
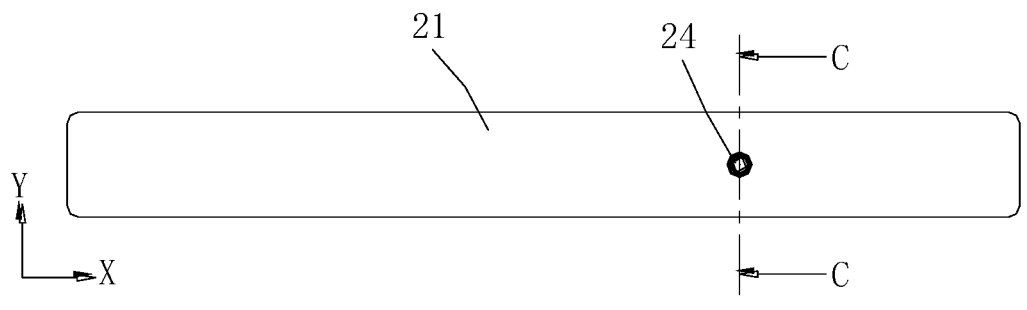
FIG. 13 is a schematic structural diagram of a battery cell from a perspective according to an embodiment of this application.
Figure 14:
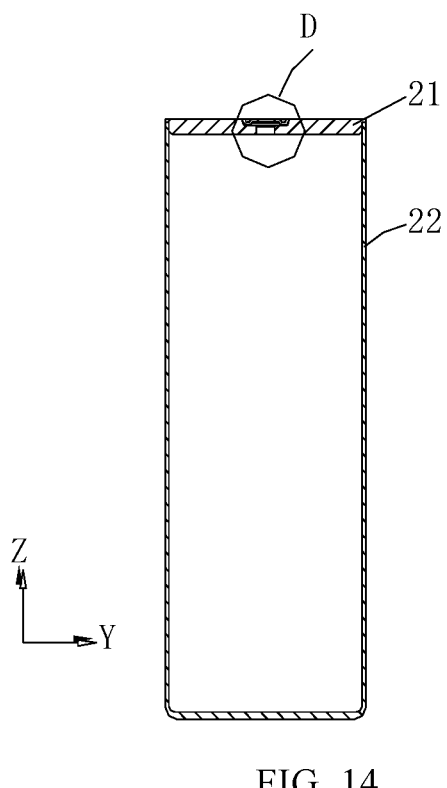
FIG. 14 is a cutaway view along a line C-C in FIG. 13.
Figure 15:
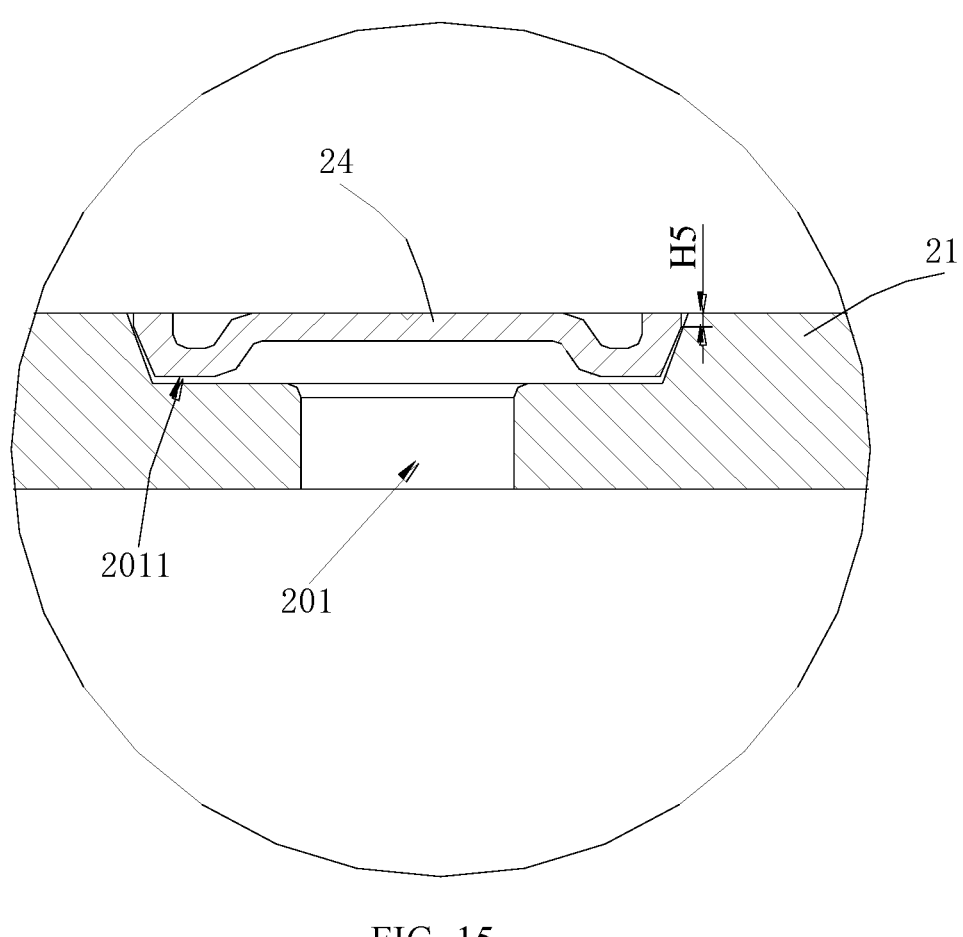
FIG. 15 is a partial enlarged diagram of a location D in FIG. 14.

In one embodiment, as shown in FIG. 2 and FIG. 13, the central hole 211 and the plurality of detection holes 212 of the same inside diameter are provided in the top surface of the insert block 120. Both the central hole 211 and the detection holes 212 are round holes. The detection holes 212 surround the central hole 211. The position of the central hole 211 and the plurality of detection holes 212 on the body 100 is the same as the position of the sealing nail 24 on the battery unit. Moreover, the inside diameter of the central hole 211 is the same as an inside diameter of the large-size segment of the liquid injection hole 201. A depth H2 of the central hole 211 is equal to a welding depth H5 of the sealing nail 24 (as shown in FIG. 15), so that the central hole 211 can simulate the position of the sealing nail 24, and the detection holes 212 around the central hole 211 can simulate the weld structure at the sealing nail 24.

Figure 16:
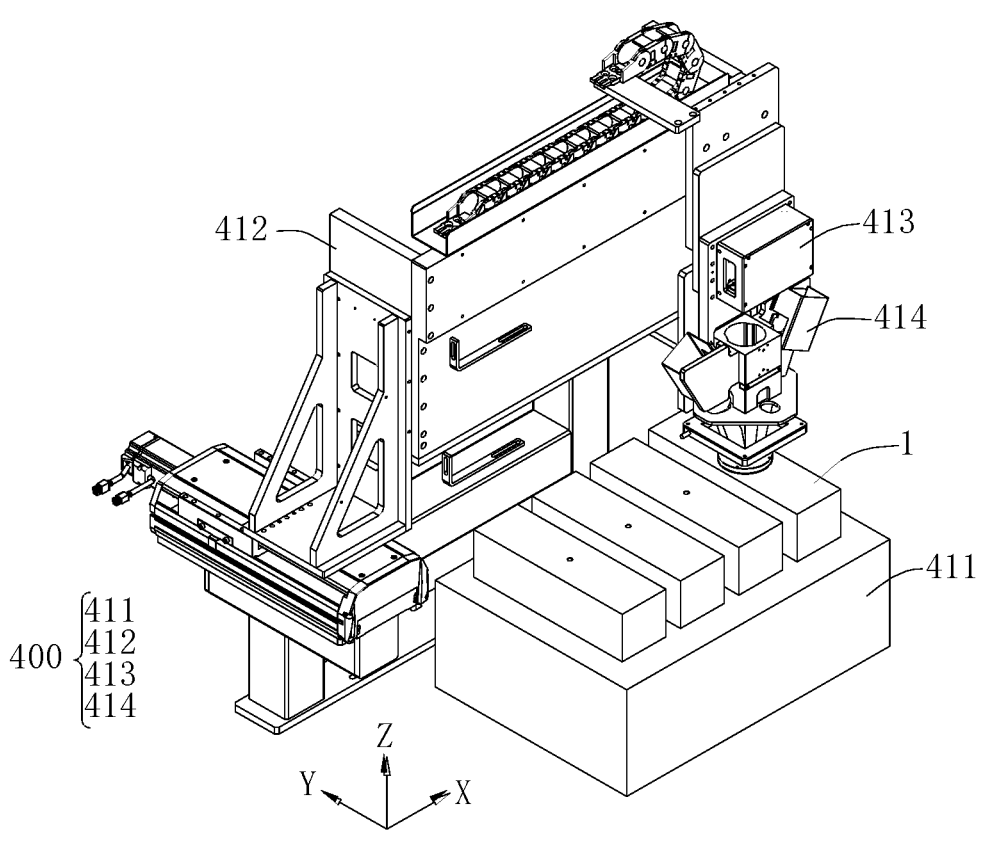
FIG. 16 is a schematic structural diagram when a camera verification piece is disposed on visual detection equipment to perform verification according to an embodiment of this application.

As shown in FIG. 16, the visual detection equipment 400 includes a carrier 411, a support mechanism 412, a camera 413 and a light source assembly 414. The light source assembly 414 and the camera 413 are mounted on the support mechanism 412. The carrier 411 is disposed below the camera 413. During verification, the camera verification piece 1 is disposed on the carrier 411, the central hole 211 and the detection holes 212 are disposed upward and located within the view field of the camera 413, after the camera 413 performs 2D imaging analysis on the roundness of the central hole 211 and the roundness of the detection holes 212, and whether the roundness of the central hole 211 and the roundness of the detection holes 212 are distorted is judged, so as to verify the 2D imaging effect of the camera 413. If there is distortion, then it means that the camera 413 is in an abnormal working state. If there is no distortion, then it means that the camera 413 is in a normal working state. Meanwhile, after the camera 413 performs 3D imaging analysis on the roundness and depth of the detection holes 212, whether the roundness and depth of the detection holes 212 are distorted is judged, so as to verify the 3D imaging quality of the camera 413. If there is distortion, then it means that the camera 413 is in an abnormal working state. If there is no distortion, then it means that the camera 413 is in a normal working state. In this way, the verification of the camera 413 can be completed. Specifically, the depth H2 of the central hole 211 may be 0.5 mm, six detection holes 212 are provided around the central hole 211, the six detection holes 212 are disposed along the circumferential direction of the central hole 211 at intervals, and the depths H1 of the six detection holes 212 are 0.02 mm, 0.04 mm, 0.06 mm, 0.08 mm, 0.1 mm, and 0.12 mm respectively. Of course, in other embodiments, the depth H2 of the central hole 211 and the quantity and depth H1 of the detection holes 212 may be other values, which may be set according to the structural characteristic parameters of the weld structure at the sealing nail 24, and will not be limited here.

In another embodiment, as shown in FIG. 11, in the actual battery unit verification process, in order to check the quality of the entire ring of weld at the top cover, the weld is divided into a first zone extending along a long side (X-axis) of the top cover and a second zone extending along a short side (Y-axis) of the top cover, a first detection station is adopted to detect the first zone, and a second detection station is adopted to detect the second zone. As shown in FIG. 5, FIG. 6 and FIG. 7, the body block 110 is rectangular. The plurality of first detection grooves 221 are provided on both the front side and the rear side of the body block 110. The first detection grooves 221 are disposed near the top of the body block 110 and are uniformly spaced along the length direction of the body block 110. The first detection grooves 221 extend along a height direction of the body block 110. The widths of the first detection grooves 221 are the same. By means of arrangement, the structure of the verification structure 200 is regular and simple, processing and production are convenient, and the plurality of first detection grooves 221 simulate the first zone. The plurality of second detection grooves 222 are provided on both the left side and the right side of the body block 110. The second detection grooves 222 are disposed near the top of the body block 110 and are uniformly spaced along the width direction of the body block 110. The second detection grooves 222 extend along the height direction of the body block 110. The widths of the second detection grooves 222 are the same. By means of arrangement, the structure of the verification structure 200 is regular and simple, processing and production are convenient, and the plurality of second detection grooves 222 simulate the second zone.

Figure 17:
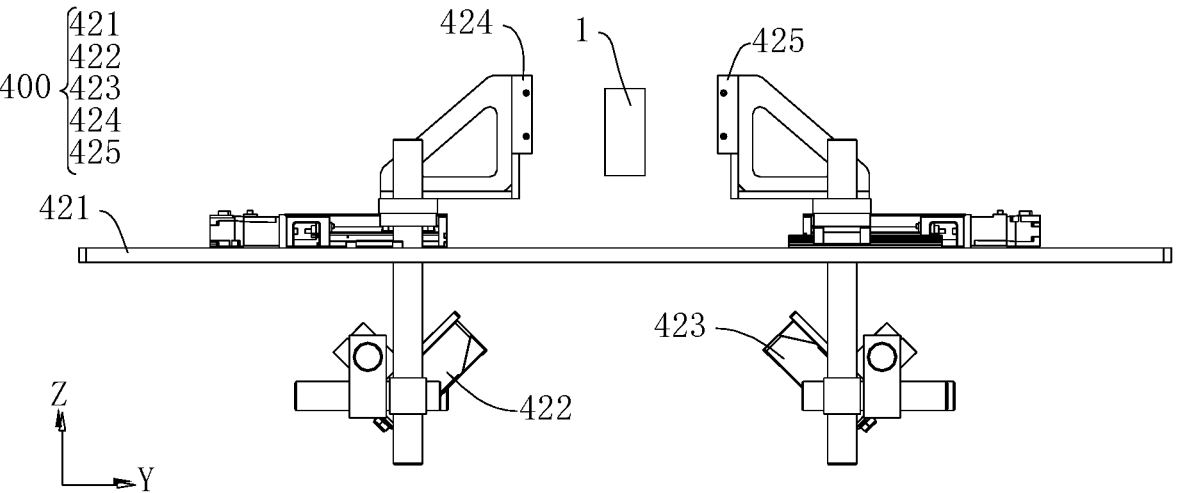
FIG. 17 is a schematic structural diagram when a camera verification piece is disposed on visual detection equipment to perform verification according to an embodiment of this application.

As shown in FIG. 17, the visual detection equipment 400 located at the first detection station includes a first support 421, a first camera 422, a second camera 423, a first light source 424 and a second light source 425. The first support 421 is provided with a first detection position. The first light source 424 and the second light source 425 are located on the left and right sides of the first detection position. The first camera 422 and the second camera 423 are located on the left and right sides of the first detection position. The first camera 422 is located below the first light source 424. The second camera 423 is located below the second light source 425. When the camera verification piece 1 is disposed at the first detection position and the front side and the rear side of the body block 110 are disposed toward the first light source 424 and the second light source 425 respectively, the first detection grooves 221 located on the front side of the body block 110 are located within the view field of the first camera 422, and the first detection grooves 221 located on the rear side of the body block 110 are located within the view field of the second camera 423, so that the first camera 422 performs 2D imaging analysis and 3D imaging analysis on the shapes of the first detection grooves 221 located on the front side of the body block 110 to judge whether the width and depth of each first detection groove 221 are distorted. If there is distortion, then it means that the first camera 422 is in an abnormal working state. If there is no distortion, then it means that the first camera 422 is in a normal working state. Meanwhile, the second camera 423 performs 2D imaging analysis and 3D imaging analysis on the shapes of the first detection grooves 221 located on the rear side of the body block 110 to judge whether the width and depth of each first detection groove 221 are distorted. If there is distortion, then it means that the second camera 423 is in an abnormal working state. If there is no distortion, then it means that the second camera 423 is in a normal working state.

Figure 18:
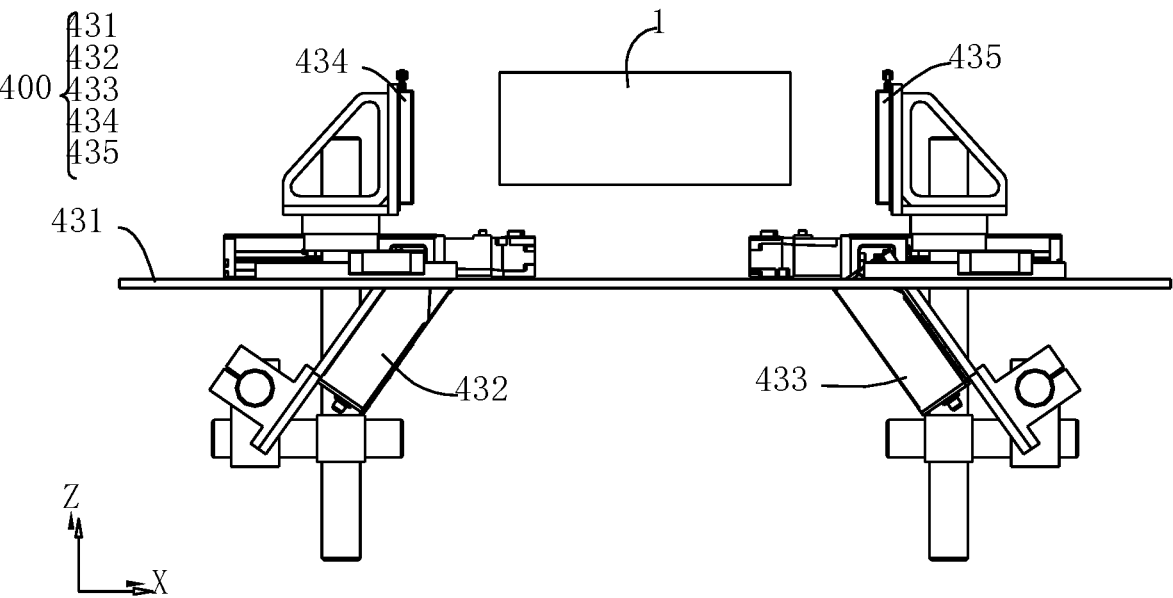
FIG. 18 is a schematic structural diagram when a camera verification piece is disposed on visual detection equipment to perform verification according to an embodiment of this application.

As shown in FIG. 18, the visual detection equipment 400 located at the second detection station includes a second support 431, a third camera 432, a fourth camera 433, a third light source 434 and a fourth light source 435. The second support 431 is provided with a first detection position. The third light source 434 and the fourth light source 435 are located on the left and right sides of the second detection position. The third camera 432 and the fourth camera 433 are located on the left and right sides of the second detection position. The third camera 432 is located below the third light source 434. The fourth camera 433 is located below the fourth light source 435. When the camera verification piece 1 is disposed at the second detection position and the left side and the right side of the body block 110 are disposed toward the third light source 434 and the fourth light source 435 respectively, the second detection grooves 222 located on the left side of the body block 110 are located within the view field of the third camera 432, and the second detection grooves 222 located on the right side of the body block 110 are located within the view field of the fourth camera 433, so that the third camera 432 performs 2D imaging analysis and 3D imaging analysis on the shapes of the second detection grooves 222 located on the left side of the body block 110 to judge whether the width and depth of each second detection groove 222 are distorted. If there is distortion, then it means that the third camera 432 is in an abnormal working state. If there is no distortion, then it means that the third camera 432 is in a normal working state. Meanwhile, the fourth camera 433 performs 2D imaging analysis and 3D imaging analysis on the shapes of the second detection grooves 222 located on the right side of the body block 110 to judge whether the width and depth of each second detection groove 222 are distorted. If there is distortion, then it means that the fourth camera 433 is in an abnormal working state. If there is no distortion, then it means that the fourth camera 433 is in a normal working state.

In a specific embodiment, as shown in FIG. 5, FIG. 6 and FIG. 7, when the visual detection equipment 400 in the first detection station detects the first zone, a structural parameter corresponding to the smallest defect in the detected first zone is a curvature of a weld bump, and the curvature parameter needs to be smaller than 0.04 mm to meet the quality requirements. Based on the above, the body block 110 is provided with three first detection grooves 221, and depths of the three first detection grooves 221 distributed along the length direction of the body block 110 is 0.02 mm, 0.04 mm and 0.06 mm respectively. By means of arrangement, the situation that the curvature parameter meets the quality requirements can be detected, and the situation that the curvature parameter does not meet the quality requirements can also be simulated, so that the imaging quality of the first camera 422 can be more comprehensively verified and the state of the first camera 422 can be more accurately judged. Similarly, when the visual detection equipment 400 in the second detection station detects the second zone, a structural parameter corresponding to the smallest defect in the detected second zone is a curvature of a weld bump, and the curvature parameter needs to be smaller than 0.04 mm to meet the quality requirements. Based on the above, the body block 110 is provided with three second detection grooves 222, and depths of the three second detection grooves 222 distributed along the width direction of the body block 110 is 0.02 mm, 0.04 mm and 0.06 mm respectively. By means of arrangement, the situation that the curvature parameter meets the quality requirements can be detected, and the situation that the curvature parameter does not meet the quality requirements can also be simulated, so that the imaging quality of the second camera 423 can be more comprehensively verified and the state of the second camera 423 can be more accurately judged.

In another embodiment of this application, visual detection equipment 400 is provided, including the camera verification piece 1.

According to the visual detection equipment 400 of the embodiment of this application, the camera verification piece 1 is adopted, the state of the camera can be timely verified by means of the camera verification piece 1, workers can timely and conveniently correct detection errors of the visual detection equipment 400, the problem that detection accuracy and detection precision of the visual detection equipment 400 are reduced is solved, and thus the visual detection equipment 400 still has good detection accuracy and detection precision after long-time detection or adjustment.

In another embodiment of this application, a verification method of visual detection equipment is provided, the visual detection equipment is adopted, and the verification method of the visual detection equipment includes the following steps:

disposing a verification structure of a camera verification piece in a view field of a camera of the visual detection equipment;

obtaining, by the visual detection equipment, structural parameters of the verification structure; and comparing the obtained structural parameters with predetermined structural parameters, if the obtained structural parameters are the same as the predetermined structural parameters or within a reasonable error range of the predetermined structural parameters, the camera being in a normal working state; and if the obtained structural parameters are different from the predetermined structural parameters or outside the reasonable error range of the predetermined structural parameters, the camera being in an abnormal working state.

If the obtained structural parameters are the same as the predetermined structural parameters or within the reasonable error range of the predetermined structural parameters, the camera is in a normal working state. It is understood that if the obtained structural parameters are the same as the predetermined structural parameters or within the reasonable error range of the predetermined structural parameters, the imaging quality of the camera is good, the camera is in a normal working state, and detection errors caused by imaging errors of the camera are reduced. If the obtained structural parameters are within the reasonable error range of the predetermined structural parameters, it is understood that a difference between the obtained structural parameters and the predetermined structural parameters is located within an allowable error range, and a specific reasonable error range or the allowable error range may be determined according to the actual test precision and other requirements, which is not specifically limited here. The predetermined structural parameters may be set according to the structural parameters of an actual detection structure, which is not specifically limited here.

If the obtained structural parameters are different from the predetermined structural parameters or outside the reasonable error range of the predetermined structural parameters, the camera is in an abnormal working state. It is understood that if the obtained structural parameters are different from the predetermined structural parameters or outside the reasonable error range of the predetermined structural parameters, the imaging quality of the camera is poor, and the camera is in an abnormal working state, which will bring large errors to the subsequent detection. If the obtained structural parameters are different from the predetermined structural parameters or outside the reasonable error range of the predetermined structural parameters, it is understood that the obtained structural parameters have a large deviation from the predetermined structural parameters.

According to the verification method of the visual detection equipment of the embodiment of this application, the visual verification equipment needs verification, the verification structure of the camera verification piece is disposed in the view field of the camera, after the camera performs imaging analysis on the verification structure of the camera verification piece, the structural parameters on the verification structure are obtained, and the obtained structural parameters are compared with the predetermined structural parameters. If the obtained structural parameters are the same as the predetermined structural parameters or within the reasonable error range of the predetermined structural parameters, it means that the obtained structural parameters are not distorted, the imaging quality of the camera is good, and the camera is in a normal working state. If the obtained structural parameters are different from the predetermined structural parameters or outside the reasonable error range of the predetermined structural parameters, it means that the obtained structural parameters are distorted, the imaging quality of the camera becomes poor, and the camera is in an abnormal working state. At this time, workers can timely need to adjust or replace the camera, the imaging quality of the camera is improved, and detection errors of the visual detection equipment are corrected timely, thereby solving the problem that detection accuracy and detection precision of the visual detection equipment are reduced, and making the visual detection equipment still have good detection accuracy and detection precision after long-time detection or adjustment.

The above is only optional embodiments of this application and not used to limit this application, and any modification, equivalent replacement, improvement, etc. made within the spirit and principle of this application should be included in the scope of protection of this application.

What is claimed is:

1. A camera verification piece, comprising:
a body; and
a verification structure provided at the body and for detection by visual detection equipment, wherein the verification structure is constructed to adapt to a to-be-detected structure on a to-be-detected part.

2. The camera verification piece according to claim 1, wherein a shape of the body is constructed to adapt to a shape of the to-be-detected part.

3. The camera verification piece according to claim 2, wherein a position of the verification structure on the body is configured to adapt to a position of the to-be-detected structure on the to-be-detected part.

4. The camera verification piece according to claim 1, wherein a shape of the verification structure is constructed to adapt to a shape of the to-be-detected structure.

5. The camera verification piece according to claim 1, wherein the verification structure comprises at least one of a verification hole, a verification groove, and a verification protrusion.

6. The camera verification piece according to claim 1, wherein the body is provided with a weight reduction slot, and the weight reduction slot is disposed avoiding the verification structure.

7. The camera verification piece according to claim 1, wherein the body comprises a body block and an insert block, the insert block is mounted on the body block, and the verification structure is formed on the insert block.

8. The camera verification piece according to claim 7, wherein the body block is an aluminum block and the insert block is a die steel block.

9. The camera verification piece according to claim 8, wherein an oxide layer is formed on a surface of the aluminum block.

10. The camera verification piece according to claim 1, wherein the verification structure comprises a central hole and a plurality of detection holes, and the plurality of detection holes are annularly disposed outside the central hole.

11. The camera verification piece according to claim 10, wherein depths of the plurality of detection holes are same or are all different.

12. The camera verification piece according to claim 10, wherein depths of the detection holes increase or decrease gradually along a circumferential direction of the central hole.

13. The camera verification piece according to claim 10, wherein a depth of each detection hole is greater than precision a size of a pixel of a camera and within a depth-of-field range of the camera.

14. The camera verification piece according to claim 10, wherein a structural parameter with a highest quality requirement of the to-be-detected structure is a first structural parameter, and a depth of at least one of the detection holes is within an error range of the first structural parameter.

15. The camera verification piece according to claim 14, wherein a depth of at least another one of the detection holes is outside the error range of the first structural parameter.

16. The camera verification piece according to claim 1, wherein the verification structure comprises a plurality of detection grooves, and the detection grooves are arranged at intervals.

17. The camera verification piece according to claim 16, wherein the detection grooves comprise a plurality of first detection grooves and a plurality of second detection grooves, the first detection grooves are arranged along a length direction of the body at intervals, and the second detection grooves are arranged along a width direction of the body at intervals.

18. The camera verification piece according to claim 16, wherein depths of the plurality of detection grooves are same or are all different.

19. The camera verification piece according to claim 16, wherein depths of the detection grooves increase or decrease gradually along an arrangement direction of the detection grooves.

* * * * *